US008296392B2

(12) United States Patent
Green et al.

(10) Patent No.: US 8,296,392 B2
(45) Date of Patent: *Oct. 23, 2012

(54) BROWSER-BASED RETRIEVAL AND DISPLAY OF CONTENT ASSOCIATED WITH A LINK THAT MATCHES A LINK SIGNATURE

(75) Inventors: Nigel Green, Bellevue, WA (US); Scott A. Mongrain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,212

(22) Filed: Jun. 6, 2011

(65) Prior Publication Data

US 2011/0238524 A1    Sep. 29, 2011

Related U.S. Application Data

(63) Continuation of application No. 11/182,502, filed on Jul. 15, 2005, now Pat. No. 7,975,019.

(51) Int. Cl.
*G06F 15/16*    (2006.01)
*G06F 15/173*    (2006.01)
*G06Q 20/00*    (2006.01)

(52) U.S. Cl. ........ 709/217; 709/218; 709/219; 709/226; 705/14.4; 705/26.1; 705/27.1

(58) Field of Classification Search .................. 709/216, 709/217–219; 705/14.1–15, 26, 27
See application file for complete search history.

(56) References Cited

U.S. PATENT DOCUMENTS 5,625,823 A * 4/1997 Debenedictis et al. ....... 717/139

(Continued)

FOREIGN PATENT DOCUMENTS

WO    99/13423 A1    3/1999

(Continued)

OTHER PUBLICATIONS

Roscheisen, M., Mogensen, C., Winograd, T., "Beyond browsing: shared comments, SOAPs, trails, and on-line communities," Computer Networks and ISDN Systems, The International Journal of Computer and Telecommunications Networking, Proceedings of the Third International World-Wide Web Conference, dated Apr. 10-14, 1995, Darmstadt, Germany, pp. 639-749.

(Continued)

*Primary Examiner* — David Lazaro
*Assistant Examiner* — Edward Kim
(74) *Attorney, Agent, or Firm* — Knobbe, Martens, Olson & Bear LLP

(57) ABSTRACT

A page update handler, which may be loaded by a web browser as part of a web page, adds functionality for dynamically updating the web page with content supplied by a content server. The content may be related to a particular item detected on the web page by the page update handler, such as a link that matches a link signature. The content server may operate in a different Internet domain from the server that servers the original web page, and may supply content for display on web pages of many different independent web sites. In one embodiment, an operator of a web site that is separate from the content server can enable the display of content from the content server on the site's web pages by adding an update handler tag to one or more corresponding HTML documents.

25 Claims, 7 Drawing Sheets

U.S. PATENT DOCUMENTS

| | | | |
|---|---|---|---|
| 5,937,163 A * | 8/1999 | Lee et al. ..................... 709/218 |
| 5,995,101 A * | 11/1999 | Clark et al. ................... 715/711 |
| 6,029,141 A | 2/2000 | Bezos et al. |
| 6,092,074 A | 7/2000 | Rodkin et al. |
| 6,269,361 B1 * | 7/2001 | Davis et al. ........................... 1/1 |
| 6,282,548 B1 | 8/2001 | Burner et al. |
| 6,314,451 B1 * | 11/2001 | Landsman et al. ............ 709/203 |
| 6,563,514 B1 * | 5/2003 | Samar ........................... 715/711 |
| 6,691,163 B1 | 2/2004 | Tufts |
| 6,778,975 B1 * | 8/2004 | Anick et al. .................. 707/710 |
| 6,850,988 B1 * | 2/2005 | Reed ............................. 709/238 |
| 6,941,277 B2 * | 9/2005 | Imago ........................ 705/26.62 |
| 7,100,123 B1 * | 8/2006 | Todd et al. .................... 715/862 |
| 7,155,528 B2 * | 12/2006 | Tam ............................... 709/230 |
| 7,296,230 B2 * | 11/2007 | Fukatsu et al. ................ 715/711 |
| 7,421,661 B1 * | 9/2008 | Canfield et al. ............... 715/752 |
| 7,451,099 B2 * | 11/2008 | Henkin et al. ............. 705/14.54 |
| 7,895,337 B2 | 2/2011 | Rossi et al. |
| 2002/0002595 A1 * | 1/2002 | Blumenau .................... 709/218 |
| 2002/0026360 A1 * | 2/2002 | McGregor et al. ............. 705/14 |
| 2002/0029259 A1 * | 3/2002 | Okada ........................... 709/219 |
| 2002/0120505 A1 * | 8/2002 | Henkin et al. .................. 705/14 |
| 2002/0120567 A1 | 8/2002 | Caplan et al. |
| 2003/0061106 A1 * | 3/2003 | Orhomuru ...................... 705/26 |
| 2003/0135460 A1 * | 7/2003 | Talegon .......................... 705/40 |
| 2003/0195974 A1 * | 10/2003 | Ronning et al. ............. 709/230 |
| 2004/0216042 A1 | 10/2004 | Consolatti et al. |
| 2004/0258089 A1 * | 12/2004 | Derechin et al. .............. 370/465 |
| 2005/0066339 A1 * | 3/2005 | Thoen ............................ 719/328 |
| 2005/0096979 A1 | 5/2005 | Koningstein |
| 2005/0267798 A1 * | 12/2005 | Panara ............................ 705/14 |
| 2006/0053224 A1 * | 3/2006 | Subramaniam ............... 709/227 |
| 2006/0069996 A1 * | 3/2006 | Greaves ........................ 715/708 |
| 2007/0005437 A1 | 1/2007 | Stoppelman |

FOREIGN PATENT DOCUMENTS

| | | |
|---|---|---|
| WO | 01/43033 A1 | 6/2001 |
| WO | 01/55897 A1 | 8/2001 |

OTHER PUBLICATIONS

Schonfeld, E., "The Great Giveaway," Burrelle's/Luce NewsExpress, Business 2.0, Circulation 610,008, pp. 1-5, dated Friday, Apr. 1, 2005.

Article titled "Accessing Web Services from DHTML," by David Massy of Microsoft, updated on Nov. 1, 2001, printed from http://msdn.microsoft.com web site.

Harald Weinreich et al., "Concepts for improved visualization of Web link attributes," Computer Networks: The International Journal of Computer and Telecommunications Networking, vol. 33, Issue 1-6 (Jun. 2000), pp. 403-416 (ISSN:1389-1286).

U.S. Appl. No. 10/720,712, filed Nov. 24, 2003.

U.S. Appl. No. 09/820,207, filed Mar. 28, 2001.

Kopetzky, T., et al., "Visual preview for link traversal on the World Wide Web," Computer Networks, Elsevier Science Publishers B.V., vol. 31, No. 11-16, May 17, 1999, pp. 1525-1532.

"inlineLink" Inline Expansion Link Methods in Hypertext Browsing, by Motoki Miura, Buntarou Shizuki and Jiro Tanaka, Proceedings of International Conference on Internet Computing (IC2001), Jun. 2001, vol. 11, pp. 653-659.

"Zero-Click: a system to support Web-browsing," by Tomoyuki Nanno, Suguru Saito and Manabu Okumura, 63rd Information Processing Society of Japan, Proceeding of the 60th National Convention, 2J-06, 2001.

"Foresight Scope: An interaction Tool for Quickly and Efficiently Browsing Linked Contents," by Shinji Fukatsu, Akihito Akutsu and Yoshinobu Tonomura, Human Computer Interaction International, pp. 1-5, Jun. 22-27, 2003.

\* cited by examiner

BROWSER-BASED RETRIEVAL AND DISPLAY OF CONTENT ASSOCIATED WITH A LINK THAT MATCHES A LINK SIGNATURE

PRIORITY CLAIM

This application is a continuation of U.S. application Ser. No. 11/182,502, filed Jul. 15, 2005, now U.S. Pat. No. 7,975,019 the disclosure of which is hereby incorporated by reference.

BACKGROUND OF THE INVENTION

1. Field of the Invention

The present invention relates to dynamic web page generation, and more specifically, relates to methods for dynamically updating or supplementing web pages with content.

2. Description of the Related Art

With the evolution of standard languages and protocols for implementing web services and related technologies, it has become common for web site operators to incorporate dynamic content into their web pages. In many cases, the dynamic content is retrieved from external web services or applications that are freely accessible via the Internet. Examples of types of dynamic content that are available via existing web services include driving directions, weather information, and product descriptions and reviews.

Some web sites provide users with the ability to interact with a service component without having to navigate away from a currently-loaded web page. For example, a web page may include a form for checking flight information made available via a web service of an airline. When a user enters a flight number into this form and selects the "submit" button, the user's browser makes a call to this web service, which returns the requested information via an XML (Extensible Markup Language) packet. The browser then uses this packet to update an area of the page with the requested flight information.

Although web sites exist that allow users to request and view content without navigating away from the current web pages (as in the example above), the types of user interactions that are possible from within the web page are typically very limited. In addition, the skills needed to add such interactive functionality are beyond the skill sets of many web site operators. For instance, to add calls to a web service from a web page, the web site operator generally must be knowledgeable of such technologies as XML, JavaScript, and style sheets. This problem pertains to some, but not all, of the disclosed embodiments.

SUMMARY

A page update handler, which may be loaded by a web browser as part of or in conjunction with a web page, adds functionality for dynamically supplementing the web page with content supplied by a content server. The content supplied by the content server may be related to a particular item on the web page, such as a link, keyword, or keyword phrase, that is detected by the page update handler. The content server may operate in a different Internet domain from the server that servers the original web page, and may supply content for display on web pages of many different independent web sites.

In one embodiment, an operator of a web site that is separate from the content server can enable the display of content supplied by the content server by merely adding an update handler tag, which may be in the form of a JavaScript command or sequence, to one or more corresponding HTML (Hypertext Markup Language) documents. Thus, the web site operator need not have any experience with technologies commonly used to add dynamic content to web pages.

In one embodiment, when a mouse-over event occurs with respect to a recognized item on the web page, such as a hyperlink that matches a particular link signature, the page update handler displays a corresponding overlay display object within the web page. The overlay display object displays supplemental content (retrieved from the content server) associated with the recognized item, and may provide functionality for the user to further interact with the content server. The supplemental content may be retrieved from the content server in response to the mouse-over event, or may be retrieved preemptively and maintained hidden until the mouse-over event occurs. As an alternative to displaying the supplemental content in an overlay display object, the page update handler may, in some embodiments, display the supplemental content elsewhere on the page. For example, the supplemental content may be displayed in a designated area on the page, may be appended at the end of the page, or may be inserted between existing display components.

Also disclosed are embodiments in which the content server that supplies the supplemental content is part of the same web site system that serves the original web page.

Neither this summary nor the following detailed description purports to define the invention. The invention is defined by the claims.

BRIEF DESCRIPTION OF THE DRAWINGS

Specific embodiments of the invention are illustrated in the drawings summarized below.

Throughout the drawings, reference numbers are re-used to indicate a correspondence between the referenced components.

DETAILED DESCRIPTION OF SPECIFIC EMBODIMENTS

Specific embodiments and example applications of the invention will now be described with reference to the drawings. These embodiments and example applications are intended to illustrate, and not limit, the present invention. The invention is defined by the claims.

I. Overview

Figure 1:
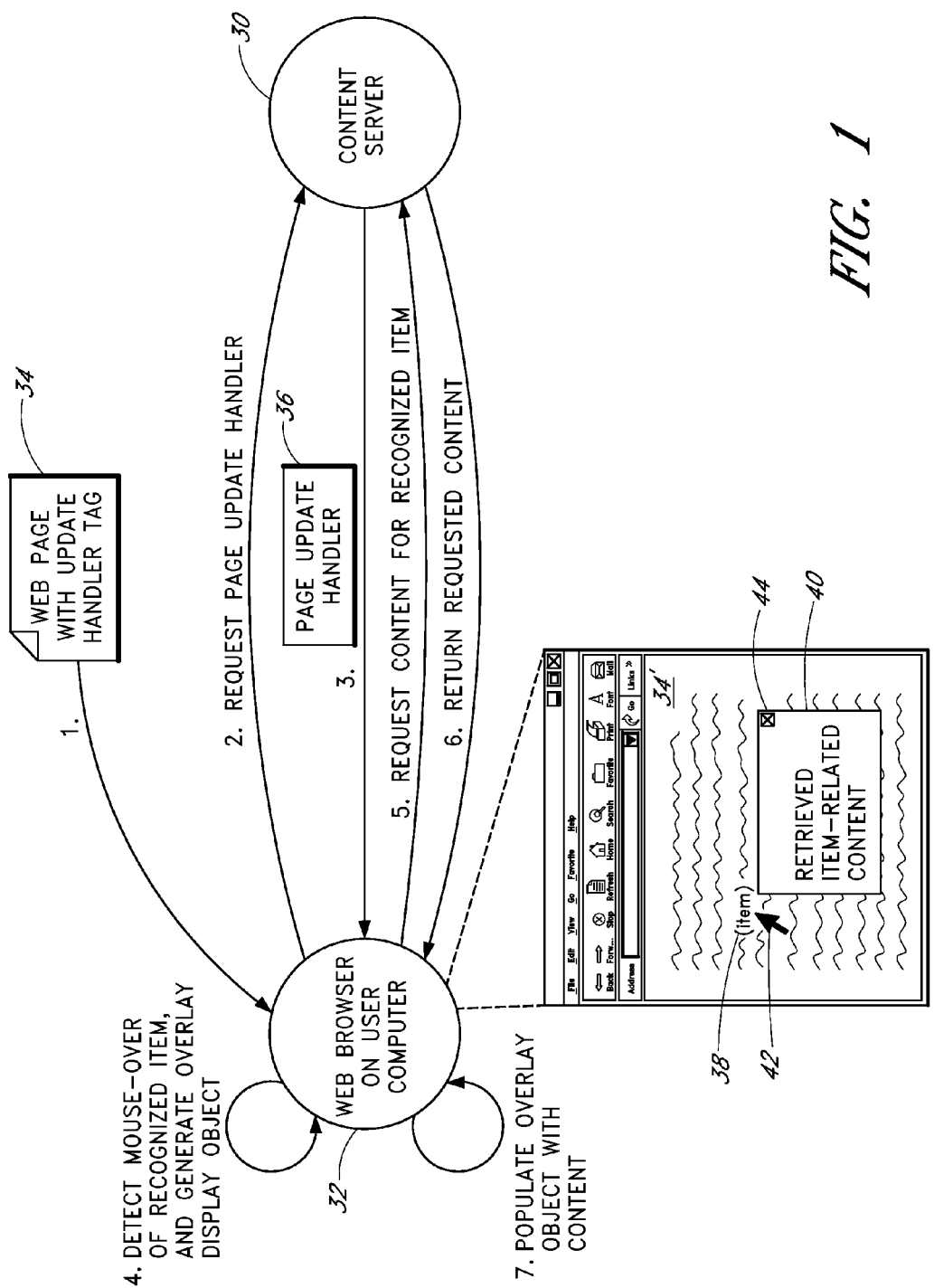
FIG. 1 illustrates a process by which a web page may be supplemented with content presented in an overlay display object according to one embodiment of the invention.
Figure 2:
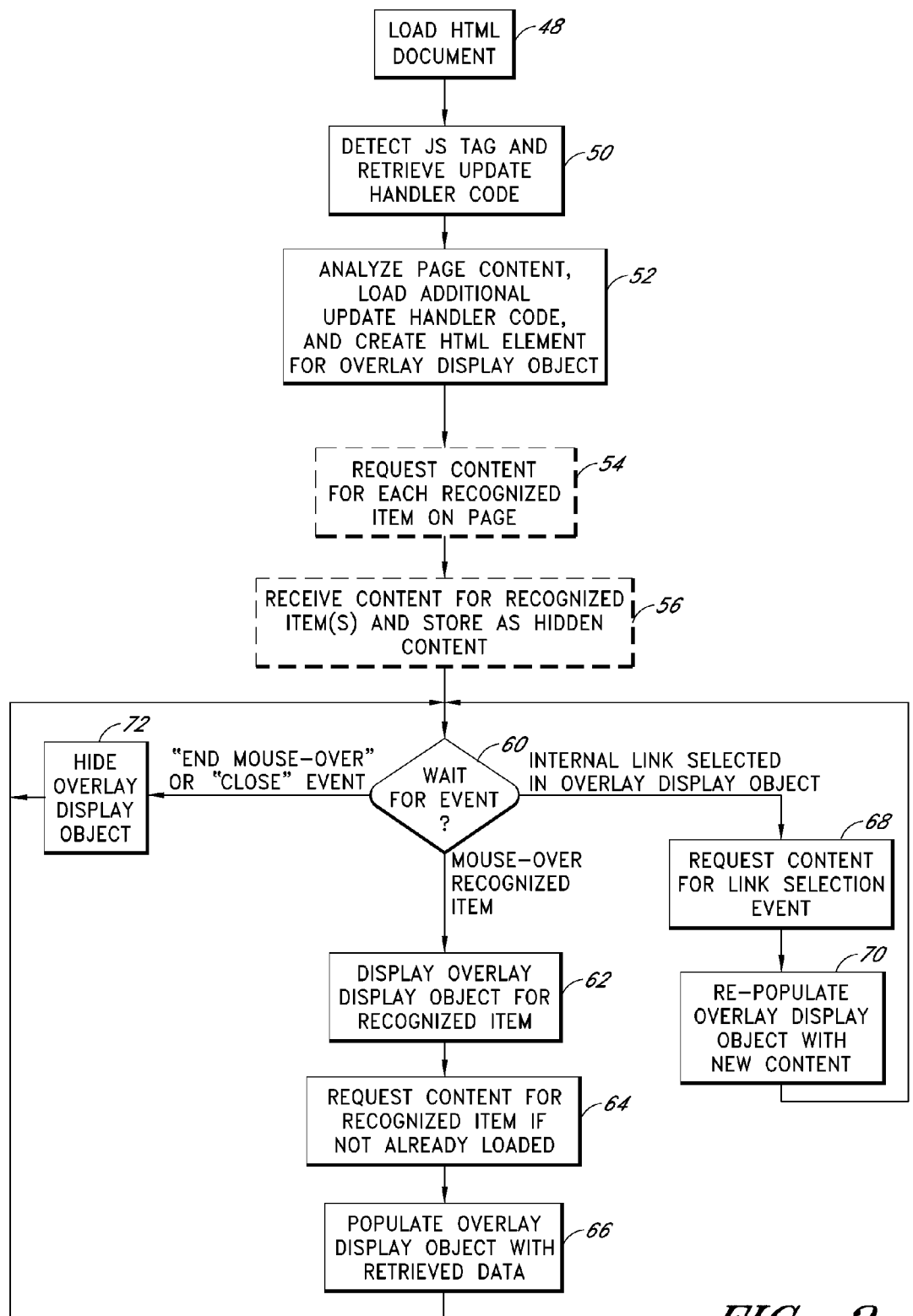
FIG. 2 illustrates steps performed by the web browser of FIG. 1 to implement the process of FIG. 1, and to support subsequent user interactions with the content server.

FIGS. 1 and 2

FIG. 1 illustrates a process by which a content server 30 updates a web page, as loaded by a web browser running on a user computer 32, according to one embodiment of the invention. The content server 30 may be implemented as a single physical server or a collection of physical servers, and may, but need not, include a web server that serves web pages of a web site. The web browser 32 may be a commercially-available web browser program, such as Internet Explorer, Mozilla Firefox, or Netscape Navigator, that supports JavaScript or another appropriate scripting language. No browser plug-ins, browser toolbars, or other special client software needs to be installed on the user computer to implement the process of FIG. 1. The illustrated interactions between the web browser 32 and the content server 30 occur over a computer network, such as the Internet.

In event 1 of FIG. 1, the web browser 32 loads and displays a web page (e.g., an HTML document) that includes an update handler tag. The web page 34 may be retrieved from the content server 30, or from a web server (not shown) that is separate from the content server 30. In one embodiment, which is described below, the web page 34 is part of a web site that is operated by an entity other than the operator of the content server 30. The update handler tag may, for example, consist of a single line, or a small number of lines, of JavaScript code, and does not itself form part of the visible content of the web page 34. The update handler tag may alternatively be in the form of an embedded Flash application, or a command or code sequence in another language (including scripting languages which may become available in the future).

In events 2 and 3, the web browser 32 responds to the update handler tag by retrieving a page update handler 36 from the content server 30. This page update handler 36, which may be composed of one or more JavaScript libraries, includes functionality for detecting mouse-over events, generating associated requests for content from the content server 30, and displaying this content within the web page 34. The particular functionality provided by the page update handler 36 may be dependent upon information included in the update handler tag. The web browser 32 may begin loading the page update handler 36 before it has finished loading the original web page 34. Although the process of loading the page update handler 36 is shown as a single event in FIG. 1, the web browser 32 may retrieve different modules or libraries of the page update handler at different times, as discussed below.

In event 4, the web browser 32, via execution of the page update handler 36, detects a mouse-over event in which the mouse pointer 42 (or the cursor associated with another type of pointing device) is moved over, or in the vicinity of, an item 38 recognized by the update handler 36. The item may, for example, be a hyperlink that matches a particular link format, or may be a keyword or keyword phrase found in a library of the page update handler 36. Although a single item 38 is shown in FIG. 1, the web page may include two or more separate items that are recognized by the page update handler 36.

In response to detecting the mouse-over event, the page update handler 36 displays an overlay display object 40, also referred to as a "popover," within the web page 34. The overlay display object 40 may be positioned in alignment with, and/or in close proximity to, the item 38 to reveal its correspondence with the item. The actual position and size of the overlay display object may be selected dynamically by the page update handler 36 based on the location of the item 38 on the page and/or the available screen real estate. Unlike a pop-up window, the overlay display object 40 is part of, and is displayed in the same browser window as, the web page 34.

In event 5, which is triggered by the mouse-over event, the web browser 32, via execution of the page update handler 36, sends a request to the content server 30 for content corresponding to the recognized item. For example, if the item 38 is a link to the home page of a recognized web site, the web browser 32 may retrieve site statistics for this web site (see FIG. 4, discussed below). As another example, if the item 38 is a link or product name corresponding to a recognized product, the web browser 32 may retrieve additional information (price, product reviews, photograph, etc.) associated with this product (see FIGS. 5 and 6, discussed below).

In events 6 and 7 of FIG. 1, the requested item-related content is returned by the content server 30, and is displayed in the overlay display object 40 to create a supplemented or updated version 34' of the web page 34. In some cases, the content returned by the content server 30 may be HTML content (e.g., a mini web page) that is suitable for immediate display in the overlay display object 40. In other cases, the content server 30 may return non-HTML content, such as XML content or JavaScript data, which is dynamically converted into HTML content by the page update handler 36. As discussed below, in embodiments in which the content server 30 operates in a separate Internet domain from that of the host that serves the original web page 34, the content server 30 may encode or "wrap" the content in a JavaScript file; this may be done in order to avoid a browser restriction against retrieving HTML content of a web page from multiple Internet domains.

While the item-related content is being retrieved (and converted to HTML content if necessary), the word "loading," and an associated graphic, may be displayed in the overlay display object 40 to notify the user that the associated content is being loaded. Once the requested content is available for display (typically about 300 to 400 milliseconds after the mouse-over event), the initial "loading" display is replaced with the requested content. In some embodiments, the overlay display object 40 may also initially display a "minimal" set of item-related content that is embedded as hidden content of the page, in which case this minimal set of content may be supplemented with the requested content shortly thereafter.

In one embodiment, the page update handler 36 is capable of generating the request for the item-related content before a mouse-over of the item 38 occurs. For example, upon being loaded, a code module of the page update handler 36 may immediately begin analyzing the native content of the web page 34 to check for recognized items; for some or all of the recognized items 38 that are found, the web browser 32 may "preemptively" generate requests to the content server 30 for the associated item-related content. In this embodiment, event 5 may, but need not, occur before event 4. If the item-related content is retrieved before the mouse-over event occurs, it may be stored as hidden content on the page (e.g., as JavaScript data or HTML content), such that the overlay display object 40 may be populated immediately (from the user's perspective) upon the occurrence of the mouse-over event. The decision of whether to have the page update handler 36 request the item-related content preemptively, versus requesting the content in response to a mouse-over event (which may or may not occur), is a design choice that involves a tradeoff between display latency and server load. Both approaches may be used within a single web page 34.

The item-related content displayed in the overlay display object 40 typically includes interactive display elements, such as buttons and other types of links, drop down menus, check boxes, and/or web forms, that can be used by the user to interact with the content server 30 (see FIGS. 4-6, discussed below). Selection of a link may cause the overlay display object 40 to be updated with new content. As one example, the overlay display object 40 may initially display a hypertext list of other items (web sites, products, etc.) that are related to the recognized item 38. If the user selects one of these related items from the list, the web browser 32 may retrieve from the content server 30, and display in the overlay display object 40, content corresponding to the selected related item.

As another example, the overlay display object 40 may display a description of a product, and may provide respective buttons for adding the product to a shopping cart, adding the product to a wish list, adding the product to a rental queue (in the case of movie titles on DVD, for example), and/or immediately purchasing the product. Selection of one of these buttons may cause the overlay display object 40 to be updated with a message confirming the requested action, and/or with interactive display elements for performing associated actions (e.g., proceeding with checkout, selecting a payment or delivery method, etc.). Thus, in some embodiments, the user can conduct entire transactions with the content server 30 (item purchases, item rentals, etc.) from within the web page 34—even if this web page was originally loaded from a separate web server of a separate web site and entity. These transactions may, but need not, involve the particular recognized item 38 or items on the web page 34.

When the user is finished interacting with the content server 30, the user can move the mouse pointer 42 away from the overlay display object 40 and recognized item 38 to cause the overlay display object 40 to be removed from the display or "closed." When this occurs, the web page 34 is again displayed in its original form, although the retrieved content may remain cached in hidden form on the page. As illustrated in FIG. 1, a persistent control 44 may additionally or alternatively be provided for closing the overlay display object 40. Other types of controls, such as a "back" button, may also be persistently displayed within the overlay display object 40 to facilitate interaction with the content server.

After the overlay display object 40 has been closed, the user may move the mouse pointer 42 to another recognized item on the page 34. If such an event occurs, events 4-7 may be repeated to generate a second overlay display object 40 (not shown in FIG. 1) for this second recognized item. The item-related content displayed in this second overlay display object 40 may, in some cases, be dependent upon how the user interacted with the content server 30 via the initial overlay display object 40. For example, if the user added an item to a shopping cart via the initial overlay display object 40, the second overlay display object may, together with content associated with the second item, display the contents of the shopping cart and an option to proceed to check out.

More generally, while the web page 34 is loaded, the user can move the mouse pointer 42 over any number of recognized items, and can return the mouse pointer to a given recognized item multiple times. Each time a mouse-over of a recognized item is detected, the page update handler 36 displays a corresponding overlay display object 40, and populates this overlay display object with (a) new content retrieved from the content server 30 in response to this mouse-over event, where this new content may be dependent upon the state of the user's browsing session, (b) content already retrieved from the content server 30 and hidden within the web page, or (c) a combination of (a) and (b). Where new content is retrieved, this new content may depend upon how the user has interacted with the content server 30 via other overlay display objects displayed on the same web page 34.

As indicated by the foregoing, the overlay display object 40 serves essentially as a mini browser window that allows the user to interact with the content server 30 without losing the context associated with the original web page 34. Unlike a pop-up window, the overlay display object 40 is part of the web page 34, and can thus interact with the original content of the web page. The overlay display object 40 in the illustrated embodiments is not capable of displaying ordinary web pages, and is not suitable for use in browsing web sites that are not specifically designed to interoperate with the page update handler 36.

In implementations in which a "close" control 44 is provided, the overlay display object 40 may, in some embodiments, remain on the screen when the user moves the mouse cursor away from it. With this feature, the user can have multiple overlay display objects 40 open at-a-time on the web page 34. This feature may, for example, be used to facilitate comparison shopping of items represented in an electronic catalog.

As will be apparent, numerous modifications to the process shown in FIG. 1 are possible. For example, although the communications associated with events 2-6 are shown as occurring with a particular content server 30, some of these events may alternatively involve communications with different content servers than others, including content servers operated by different entities than others. For instance, the page update handler 36 (or specific portions of the page update handler) may be retrieved from a server operated by a "technology provider" entity, and the content associated with the recognized item(s) 38 may be retrieved from a server operated by a separate "content provider" entity.

As another example, the update handler may display the supplemental content on the page without using an overlay display object. For example, the supplemental content may be inserted on the page between existing display elements, such that the page is effectively expanded to accommodate the added content. Alternatively, the page may include a designated area that is filled in, or overwritten, with the supplemental content. Thus, the present invention is not limited to embodiments that use overlay display objects.

FIG. 2 illustrates the steps performed by the web browser 32 to implement the process of FIG. 1, and to support subsequent user interactions with the content server 30. In block 48, the web browser 32 loads an HTML document which includes the native content of the web page 34, and which also includes a JavaScript (update handler) tag. As mentioned above, this HTML document may be retrieved from a web site/server that is separate from the content server 30. The update handler tag may directly or indirectly specify the type(s) of dynamic content and functionality to be added to the web page (as discussed below), and may be included in the body of the HTML document. The following is an example what this tag may look like:

```
<script language="JavaScript1.2"
src="http://www.source.com/gp/azd.html?ppo=1&ald=1"></script>
```

In block 50, in response to detecting and executing the JavaScript ("JS") update handler tag, the web browser 32 loads at least some of the JavaScript code of the update handler 36. The particular functionality provided by this code may depend on information included in the update handler tag. For example, the tag may specify the type or types of popovers (overlay display objects) that are to be enabled on the page, in which case update handler code for generating these types of popovers may be loaded.

As mentioned above, the code of the page update handler 36 may be loaded over time via a sequence of events. For example, in one embodiment, which is depicted in block 52, the browser 32 initially loads a code module (one or more JavaScript libraries) that, upon execution by the browser, analyzes the native content of the web page 34. Based on the outcome of this analysis, this initial code module may generate requests for one or more additional JavaScript code libraries that are appropriate for providing popover functionality in the web page 34. For example, the initially loaded code module may detect that the page includes a certain type of link, and may then load a JavaScript library for providing popover functionality for this type of link. The update handler code modules that are loaded may also depend upon detected attributes of the browser environment, such as the type and version of the web browser. In comparison to a "one size fits all approach," this iterative approach to loading the update handler code reduces the total quantity of code that is typically loaded on a given page.

In some cases, a particular JavaScript library file may already be cached by the web browser 32 as the result of a prior web page viewing event. In this situation, the web browser 32 may load the JavaScript library from its cache rather than from the content server 30.

Blocks 54 and 56 of FIG. 2 represent optional steps that are performed if some or all of the item-related content is to be loaded preemptively, without waiting for a mouse-over event. In block 54, the web browser 32, via execution of the dynamic update handler 36, requests item-related content from the content server 30 for some or all of the items recognized on the page. In block 56, the web browser 32 stores this item-related content on the page in hidden form. This may be accomplished by, for example, creating a hidden page element, such as a DIV or SPAN element, and storing the content as part of this element. Alternatively, the item-related content may be transmitted to the web browser 32 as part of a secondary web page that is loaded within a hidden window of the web browser, and may subsequently be copied over to the original web page for display. Examples of methods that may be used to store hidden content in a web page or in a hidden window, and to subsequently update the visible display of the page with the hidden content, are described in U.S. application Ser. No. 10/720,712, filed Nov. 24, 2003, the disclosure of which is hereby incorporated by reference.

In block 60, the update handler 36 waits for an event, and specifically for a mouse-over event if no overlay display object 40 is currently open. In response to a mouse-over event of a recognized item (e.g., a link), the update handler 36 generates the visible overlay display object 40 for the recognized item (block 62). In one embodiment, the overlay display object is created using an absolutely positioned DIV element. This DIV element may initially be created as a hidden element (e.g., when the web page's content is initially analyzed), and may be made visible in response to the mouse-over event. As mentioned above, the hidden DIV element may also be used to store any item-related content that was preemptively requested or "prefetched" prior to the mouse-over event.

As mentioned above, the position and size of the overlay display object 40 may be selected dynamically by the update handler code. For example, in one embodiment, the overlay display object 40 is positioned on whichever side (right or left) of the recognized item 38 that has more space available. Although depicted in FIGS. 4-6 as partially obstructing the view of the recognized item (link) 38, the overlay display object 40 may be positioned just above or below the link 38, such that the entire link remains visible.

In block 64, if the content for the recognized item 38 has not already been loaded via a preemptive request or a prior mouse-over of this item 38, the update handler 36 requests this content. An identifier of the recognized item 38 may be passed as an argument with this request. For example, if the item 38 is a link to a URL that matches the signature of a product detail page, an identifier of the product may be extracted from the link and included with the content request.

In block 66, the requested content is received from the content server 30, and is used to populate the overlay display object 40. As mentioned above, if the received content is not in an HTML format, the page update handler 36 may first convert this content into HTML content.

As depicted by blocks 68 and 70, if the user selects an internal link displayed in the overlay display object 40 (namely a link which points back to the content server 30), the update handler 36 submits a corresponding URL request to the content server 30. The content returned in response to this request is then used to re-populate the overlay display object 40.

As depicted by block 72, if the user moves the mouse pointer 42 away from the overlay display object or selects a "close" control 44 (if provided), the update handler 36 removes the overlay display object from the visible display of the web page. This may be done, for example, by making the associated DIV element hidden, without deleting its content.

One variation to the process shown in FIGS. 1 and 2 is to have the page update handler 36 postpone the analysis of the web page's content (block 52) until a mouse-over event occurs, and to limit the analysis to the content associated with the mouse-over event. For example, if and when a user hovers the mouse pointer 42 over a particular link, the page update handler may determine whether the link matches a particular link signature. If the link is found to match this signature, the page update handler may display an overlay display object in the vicinity of the link, and retrieve the associated supplemental content from the content server. This variation may provide better performance for some applications.

II. Implementations Involving Multiple Web Sites

FIG. 3

Figure 3:
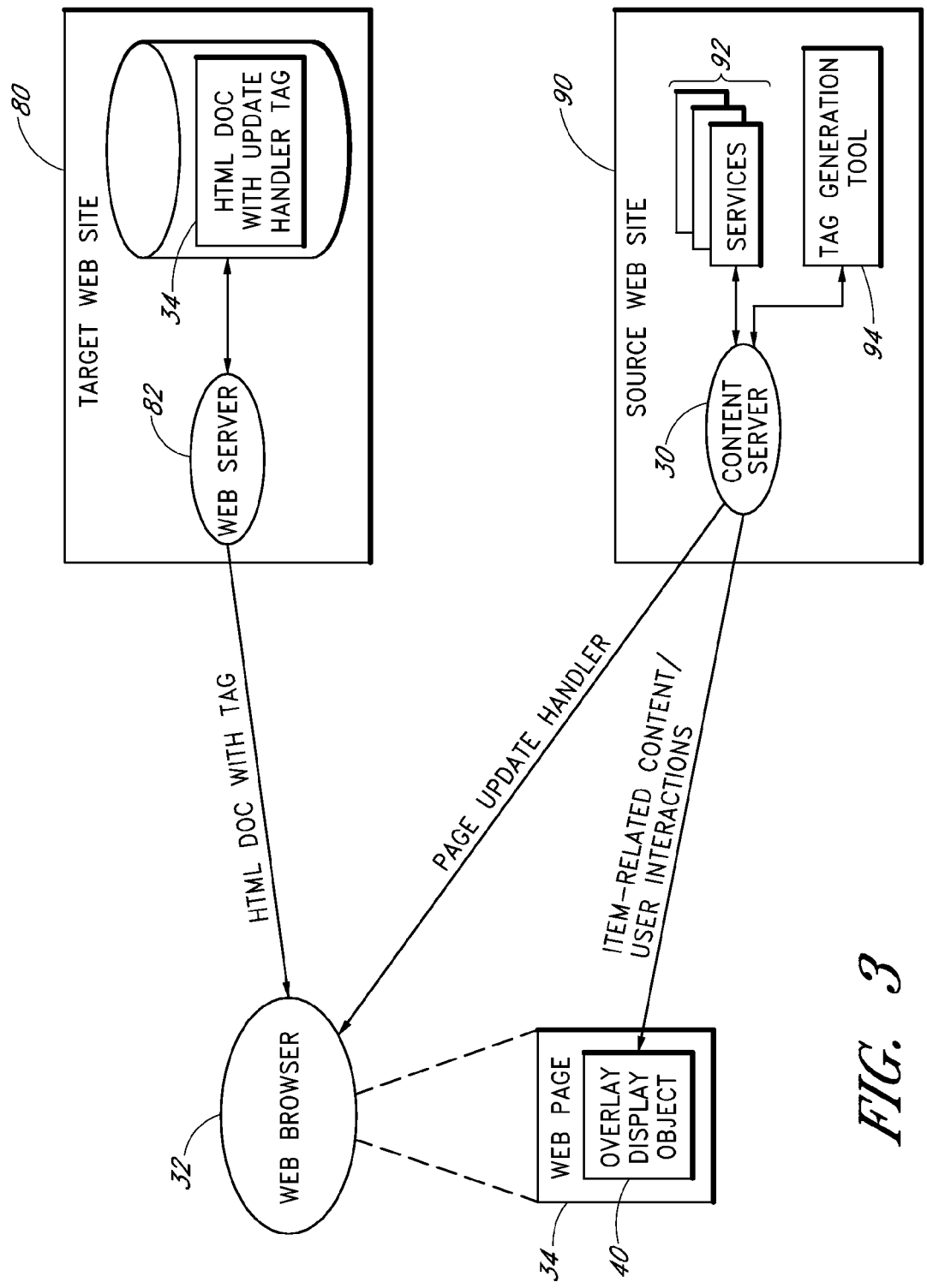
FIG. 3 illustrates a multi-site implementation of the process shown in FIG. 1.

FIG. 3 illustrates how the process depicted in FIGS. 1 and 2 may be used to supplement or update one or more web pages of a "target" web site 80 with interactive content supplied by a "source" web site 90. The content server 30 of the source web site 90 corresponds to the content server 30 shown in FIG. 1, and is therefore labeled with the same reference number. The source and target web sites typically reside in different Internet domains, and are operated by different respective entities.

The target web site 80 may, for example, be operated by an entity that lacks the expertise needed to provide dynamically interactive web pages. The owner or operator of the target web site 80 is referred to herein as a "target entity." The content served by the web server 82 of the target web site 80 may, for example, consist primarily or exclusively of static HTML documents. A web page of the target web site 80, and particularly a web page that is configured to be supplemented with content supplied by the source web site 90, is referred to herein as a "target page."

In accordance with one aspect of the invention, the target entity can add dynamic content and functionality to some or all of its web pages merely by adding an update handler tag to the corresponding HTML document or documents, as depicted for one HTML document 34 shown in FIG. 3. As mentioned above, this tag may consist of a single line of JavaScript code that can be added to the HTML document 34 at any appropriate location. Thus, in contrast to existing webservice-based methods, the target entity can make its web pages dynamically interactive by merely cutting and pasting (or manually typing) a tag into existing HTML documents. As described below, information included in this tag may directly or indirectly specify, to the source web site 90, the type or types of dynamic content and functionality to be added to the associated web page(s).

The source web site 90 may be operated by a separate entity that acts as an "overlay service provider" or "dynamic content provider" with respect to the target web site 80, and potentially many other target web sites operated by other target entities. The content supplied by the source web site 90 for display in the target page(s) of the target web site 80 may vary widely depending upon the particular application. For example, in some applications, the source web site 90 may merely supplement one or more pages of the target web site 80 with supplemental information about items found within these web pages. In other applications, the source web site 90 may additionally supplement target pages with functionality for users to purchase items, rent items, submit item reviews, create marketplace and/or auction sales listings, communicate with other users, view personalized item recommendations, join communities, and/or perform other types of interactive operations.

The content and functionality added by the source site 90 to the target pages may also be accessible to users via web pages served directly by the source web site 90. For example, in one embodiment, the source web site 90 is an e-commerce site which hosts an electronic catalog of products, and which provides functionality for users to purchase, sell, rent, and/or conduct other types of transactions involving particular products. By adding update handler tags to their web pages, target entities effectively expose some or all of the catalog content and functionality of the e-commerce web site 90 via overlay display objects 40 presented within the target pages 34. Examples of the types of catalog content and functionality that may be provided by such an e-commerce/source web site 90, and which may be added to target pages using the methods of the present invention, are described in the following U.S. patent documents, the disclosures of which are hereby incorporated by reference herein: U.S. Pat. No. 6,853,982, issued Feb. 8, 2005; U.S. Patent Pub. 2003/0204449 A1, published Oct. 30, 2003, and U.S. application Ser. No. 09/900,487, filed Jul. 6, 2001.

As depicted in FIG. 3, in the illustrated embodiment, at least some of the dynamic content served by the content server 30 of the source web site 90 is supplied by a set of services 92, which may but need not be implemented as web services. These services 92 may include one or more services that are responsible for supplying the page update handler 36 code, and the associated content, that is incorporated into the target web pages 34.

One problem associated with updating a web page with content supplied from another Internet domain is that existing web browsers do not permit such "cross-domain" serving of HTML content. In accordance with one aspect of the invention, this limitation is overcome by embedding or wrapping the supplemental or "item-related" HTML content in a JavaScript code library or file, or in another type of script file that can be served across Internet domains. To retrieve the supplemental content, the web browser/update handler requests the JavaScript file from the content server 30. The content server 30 responds to this request by (1) generating or retrieving the item-related HTML content associated with the particular item involved, (2) converting the HTML content into a JavaScript format, (3) incorporating this converted content into a JavaScript file, and (4) returning the JavaScript file to the web browser 32. The page update handler code executed by the web browser 32 then extracts the content from this JavaScript file, converts it back into HTML content, and displays it in the overlay display object 40 (or elsewhere on the page in some embodiments). Because web browsers are capable of retrieving JavaScript files across Internet domains, the cross-domain limitation mentioned above is avoided.

Step (2) in the above process may, for example, be performed by placing quotes around strings of HTML content and assigning these strings to JavaScript variables, and by using substitution to replace certain HTML elements with elements that are legal in JavaScript. The update handler code may perform the reverse process to convert the JavaScript back into HTML content. In some embodiments, the item-related content may originally be generated by the content server 30 in a JavaScript format, in which case steps (1) and (2) in the above-described process may be omitted.

As further illustrated in FIG. 3, the source web site 90 may include a tag generation tool 94 that can be accessed by a target entity to interactively generate a custom tag to add to one or more of its web pages. The tag generator tool 94 may alternatively be provided on a separate web site, or may be provided as a utility that can be downloaded and executed locally by the target entities. The ability for target entities to create and use custom update handler tags is not essential. For example, all target entities could use the same, generic update handler tag, or could be asked to select from a small set of supported tags.

In one embodiment, a target entity may specify, via one or more web pages associated with the tag generation tool 94, the particular type or types of overlay display objects that are to be enabled on a target web site or page. The user interface for performing this task may, for example, include check boxes that can be selected by the target entity. The following are examples of specific types of overlay display objects (popovers) that may be made available to the target entity. A separate check box may be provided for enabling/disabling each of these three types of popovers.

Web Link Popover: This type of overlay display object is displayed when the user hovers the mouse pointer over a hyperlink recognized as corresponding to a particular web site other than the source or target web site. The web link popover displays information about the web site to which the hyperlink corresponds (site rank, related web sites, etc.). An example of a Web Link Popover is shown in FIG. 4, discussed below.

Product Popover: This type of overlay display object is displayed when the user hovers the mouse pointer over a hyperlink recognized as corresponding to a particular product (e.g., a link which matches the signature of a product detail page of a particular merchant web site). The product popover displays information about this product, and may include links for navigating to other products. The product popover may also include buttons for selecting a product to purchase or rent, completing a purchase or rental transaction, and/or performing other types of transactions. In one embodiment, if the target web site 80 is an associate web site in an affiliate marketing program of the source web site 90, the target entity is paid a commission on any sales that result from the product link popovers. An example of a product popover is shown in FIG. 5, discussed below. In addition, a description of how product popovers may be used in the context of an affiliate marketing program is provided in section IV below.

Sponsored Link Popover. This type of overlay display object is displayed when the user hovers the mouse pointer over a recognized keyword or keyword phrase on the target page. The sponsored link popover displays one or more advertisements (sponsored links) associated with this keyword or keyword phrase, as served by an ad server of the source web site 90. To support this feature, the source web site 90 may include a user interface through which web site operators can post advertisements for their respective web sites, and associate these advertisements with particular keywords and/or keyword phrases. As is conventional in sponsored-link type systems, the advertisers (i.e., the web site operators who post ads) may also be able to bid on particular keywords and keyword phrases. If a user clicks on a sponsored link on a target web page 34 of a particular target entity, the target entity may be paid a fee by the operator of the source web site 90. In one embodiment, the target entity can specify the keywords/keyword phrases for which this feature is to be enabled (or disabled) on its target web site(s) by uploading a library file to the source web site 90.

The foregoing are merely examples of specific applications for which overlay display objects may be used, and are not intended to be limiting. Numerous other applications will be apparent to those skilled in the art. In addition, as mentioned above, the content that is displayed in the overlay display objects in the above examples may alternatively be displayed on the web pages without the use of overlay display objects.

In the foregoing and other applications, the supplemental content may be retrieved at the time of the mouse-over event to ensure that it is up to date. For example, in the case of a product popover that displays product price and availability information, a user may not hover the mouse cursor over a product or product link until several minutes, and in some cases several hours, after loading the web page. By retrieving the price and availability information when the mouse-over event occurs rather than when the page is loaded, the risk that outdated information will be presented to the user is significantly reduced.

Similarly, the task of analyzing the content of the web page can be postponed, and/or repeated, as needed to ensure that new elements that are added to the rendered page are properly analyzed. For example, suppose that the page update handler 36 (or some other process) updates the rendered web page over time with new links or other content items. To ensure that these new content items are analyzed (so that supplemental content can be retrieved and displayed for any new items that are recognized), the update handler 36 may, for example, be designed to analyze an item whenever a mouse-over of that item occurs.

In addition to specifying the types of overlay display objects 40 that are to be displayed, the target entity may be given the option to specify, via the source web site 90, one or more parameters for controlling the behavior of the overlay display objects. For example, the target entity may be able to specify one or more of the following: (1) the display size to be used for the overlay display objects; (2) the display format (font, color, etc.) to be used to display content in the overlay display objects; (3) whether the name of the user is to initially be displayed in the overlay display object when the user is recognized (via a browser cookie) by the source web site; (4) whether users are to be presented with an option to disable the display of overlay display objects on the target page; (5) whether the overlay display objects are to remain open on the page such that multiple display objects may be open concurrently.

Once the target entity has specified the type(s) of popovers to be included, and any associated parameters, the source web site 90 (tag generation tool 94) may output an update handler tag that can be copied into one or more HTML documents by the target entity. This tag may include encoded information that directly specifies the selections made by the target entity. Additionally or alternatively, the target entity's selections may be recorded on a server of the source web site 90, in which case the tag may include a unique target identifier that is used to look up the selections of the target entity. Where the selections are specified directly in the tag, the associated encoding format may be sufficiently intuitive to allow unsophisticated target entities to manually create and edit their own tags.

III. Example Applications Involving Multiple Web Sites

Figure 4:
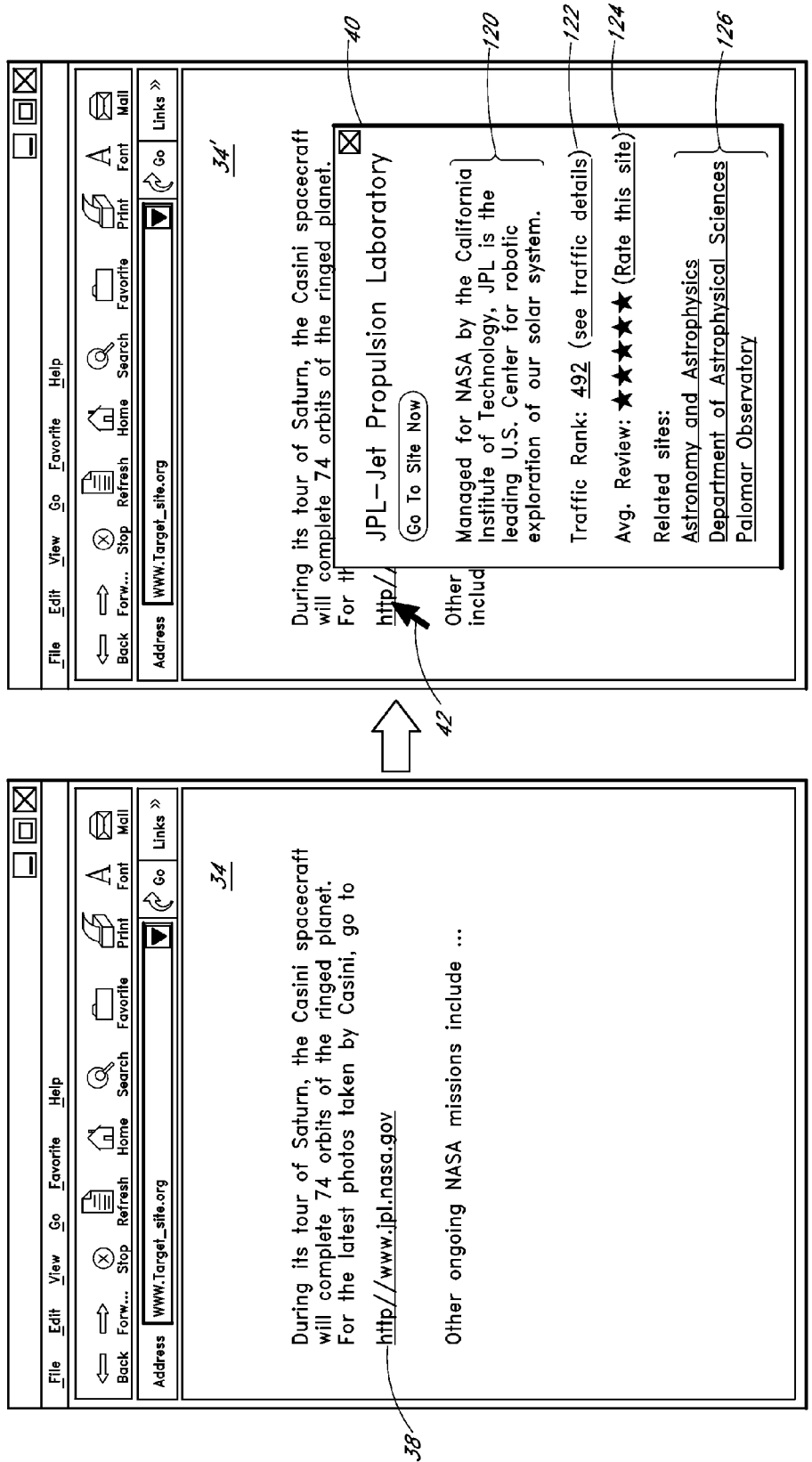
FIGS. 4 and 5 depict examples how content supplied by a source web site may be dynamically added to a web page of a target web site using the process of FIG. 1.
Figure 5:
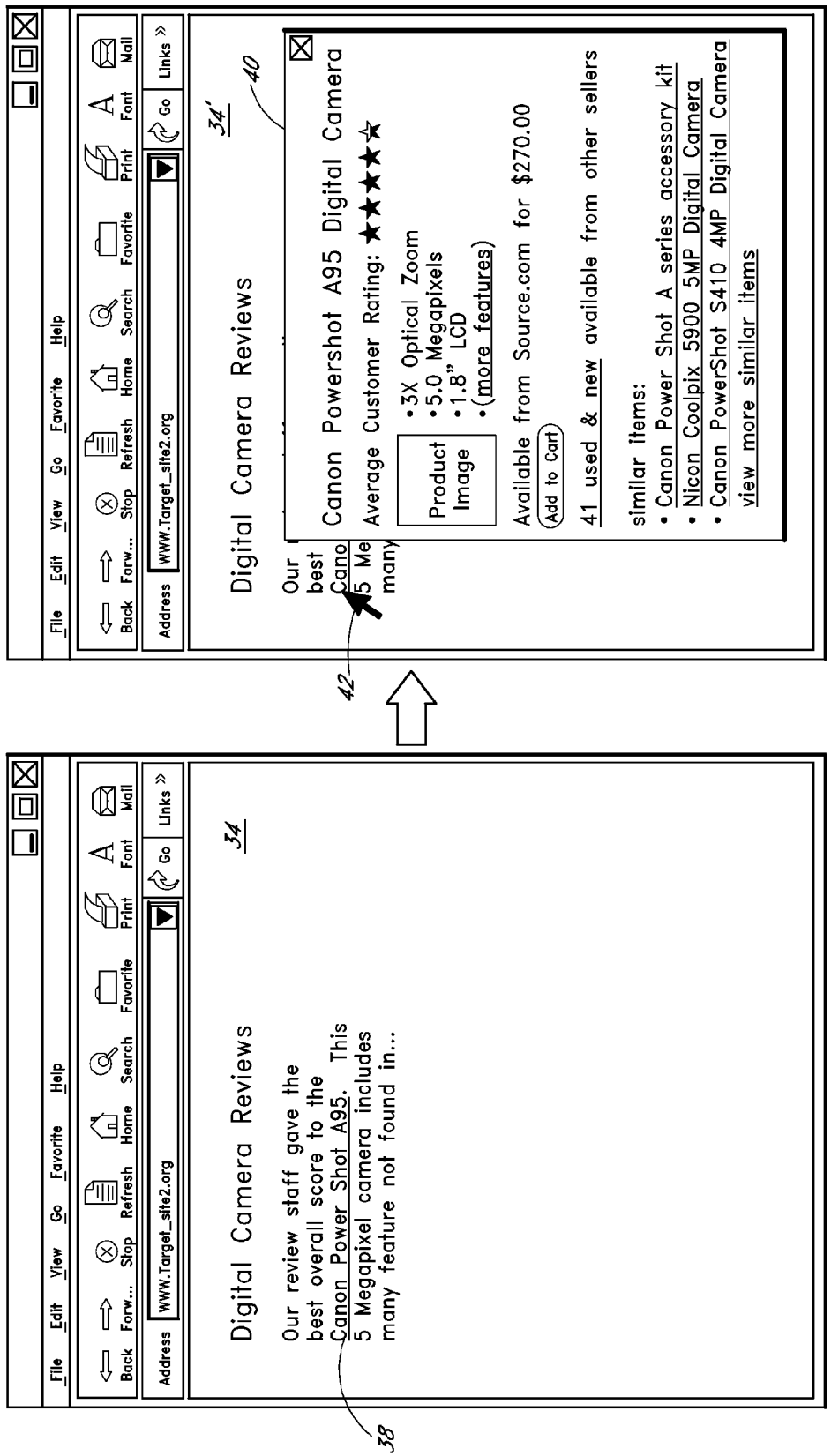

FIGS. 4 and 5

FIG. 4 illustrates one example of how the invention may be used to provide dynamic content within a target web page 34 of a target web site 80. In this example, a web link popover 40 is displayed in response to the user moving the mouse cursor 42 over a recognized link 38 to an external web site (i.e., one that is separate from both the target site 80 and the source site 90). The external web site in this example is the Jet Propulsion Laboratory web site. The web link popover 40 displays a description 120 of the external web site, the external web site's traffic rank 122, an average user rating 124 of the external web site together with an option to rate the site, and a hypertext list 126 of related web sites. Thus, the user is provided with information about the external web site without having to navigate away from the web page 34 or open a separate browser window, and without the need for a browser plug-in that provides this type of functionality. In this example and the examples shown in FIGS. 5 and 6, the content displayed in the overlay display object 40 may be retrieved from the source web site 90 either before the mouse-over event or in response to the mouse-over event.

FIG. 5 illustrates an example in which the target web site 90 is a product review site that does not itself sell the reviewed products. The native content of the target web page 34 includes a link 38 to a product detail page of a product catalog hosted by the source web site 80, which is an e-commerce site in this example. The link 38 may alternatively point to a product page of another web site. When the user hovers the mouse cursor 42 over the link 38, a product popover 40 is displayed with associated catalog content retrieved from the source web site 90.

In this example of FIG. 5, the popover content includes a description, image, and average customer rating of the product, a link ("add to cart" button) for adding the product to a shopping cart of the source web site 90, and a hypertext list of similar products in the catalog of the source web site. If the user opts to add this or another product to the shopping cart, the user can, if desired, complete the purchase of the product (and any other products in the cart) via the product popover 40, without navigating away from the web page 34 or opening a separate browser window. As mentioned above, if the target web site 80 is registered as an associate of the source web site 90, the target entity may be paid a commission on any transactions initiated via the product popover 40. The popover in this example also includes a link labeled "41 used and new," which can be selected to view listings for this product from marketplace sellers.

A number of variations to the model depicted in FIG. 5 are possible. For example, the target site 80 may itself include functionality for selling the product, and may rely on the source web site 90 solely to supply supplemental product information to its customers. With this variation, the product popover 40 would lack functionality for conducting purchase transactions, but may otherwise include similar content to that shown in FIG. 5. As another example, the update handler may be capable of recognizing the product name "Canon PowerShot A95" in the visible content of the target web page 34, and may generate the popover in response to detecting this product name. With this variation, the target entity need not provide product links in order to enable product popovers to be displayed.

IV. Display of Popovers on Associate Sites

As mentioned above, one particular application for overlay display objects involves displaying product popovers on target web sites 80 that are enrolled in an affiliate marketing or "associates" program. This feature of the invention may be implemented as follows. The source web site 90 may host an electronic catalog of products that are available for purchase, and may implement an associates program for compensating web site operators who refer customers to the source web site 90. The associates program may, for example, be implemented as described in U.S. Pat. No. 6,029,141, the disclosure of which is hereby incorporated by reference.

The associates program may, for example, be implemented as described in U.S. Pat. No. 6,029,141, the disclosure of which is hereby incorporated by reference. With this type of program, an associate (target) web site 80 will typically describe one or more particular products, and will include hyperlinks to the corresponding product detail pages on the source web site 90. Each such hyperlink is encoded or tagged with a unique identifier of the associate, so that the source web site 90 can identify the associate responsible for each user referral event. When a user follows such a link and then makes a purchase from the source web site 90, the associate is paid a commission.

One feature of the invention enables associates to add product popovers to their respective web sites. In one embodiment, the associate enables product popovers on a given page by adding a single line of JavaScript code to the HTML document 34 for that page, as described above. The product popovers may, for example, be displayed only in conjunction with links to product detail pages of the source web site 90. Each such popover may enable users of the associate web site 80 to make purchases from the source web site 90 entirely from within the target web page 34 of the associate web site, as described above.

In some cases, an associate web site 80 may include a link to the home page, or to another non-product-specific page, of the source web site 90. For this type of link, an overlay display object (popover) 40 may be displayed that includes a list of recommended products. These recommendations may be based on the purchasing activities of other users who have been referred to the source web site 90 from this particular associate web site 80, and possibly other associate sites falling in the same category. Specific examples of algorithms that may be used to provide such associate-site-specific product recommendations are described in U.S. application Ser. No. 10/987,309, filed Nov. 12, 2004, the disclosure of which is hereby incorporated by reference. If the user is recognized by the source site 90, the product recommendations may additionally or alternatively be personalized for the particular user based on the user's past purchasing and/or browsing activities. Examples of methods that may be used to generate such personalized product recommendations are described in U.S. Pat. No. 6,853,982, referenced above.

Other types of popover functionality may be made available to the associates as well. For example, the associates may be provided with a shopping cart object that can be added to their web pages. When a recognized user hovers the mouse cursor over this object (which may be displayed as a shopping cart icon on the associate web site), the page update handler 36 may generate a popover showing the contents of the user's shopping cart, as maintained by the source web site.

This feature of the invention (namely the addition of popovers to associate web sites) is also applicable to affiliate marketing programs involving other types of transactions and items, including rentals of DVDs and purchases of services and subscriptions. In addition, this feature is applicable regardless of whether the source web site 90 implements it own affiliate marketing program versus outsourcing the program to a separate affiliate marketing service provider.

V. Example Applications Involving a Single Web Site

FIG. 6

Figure 6:
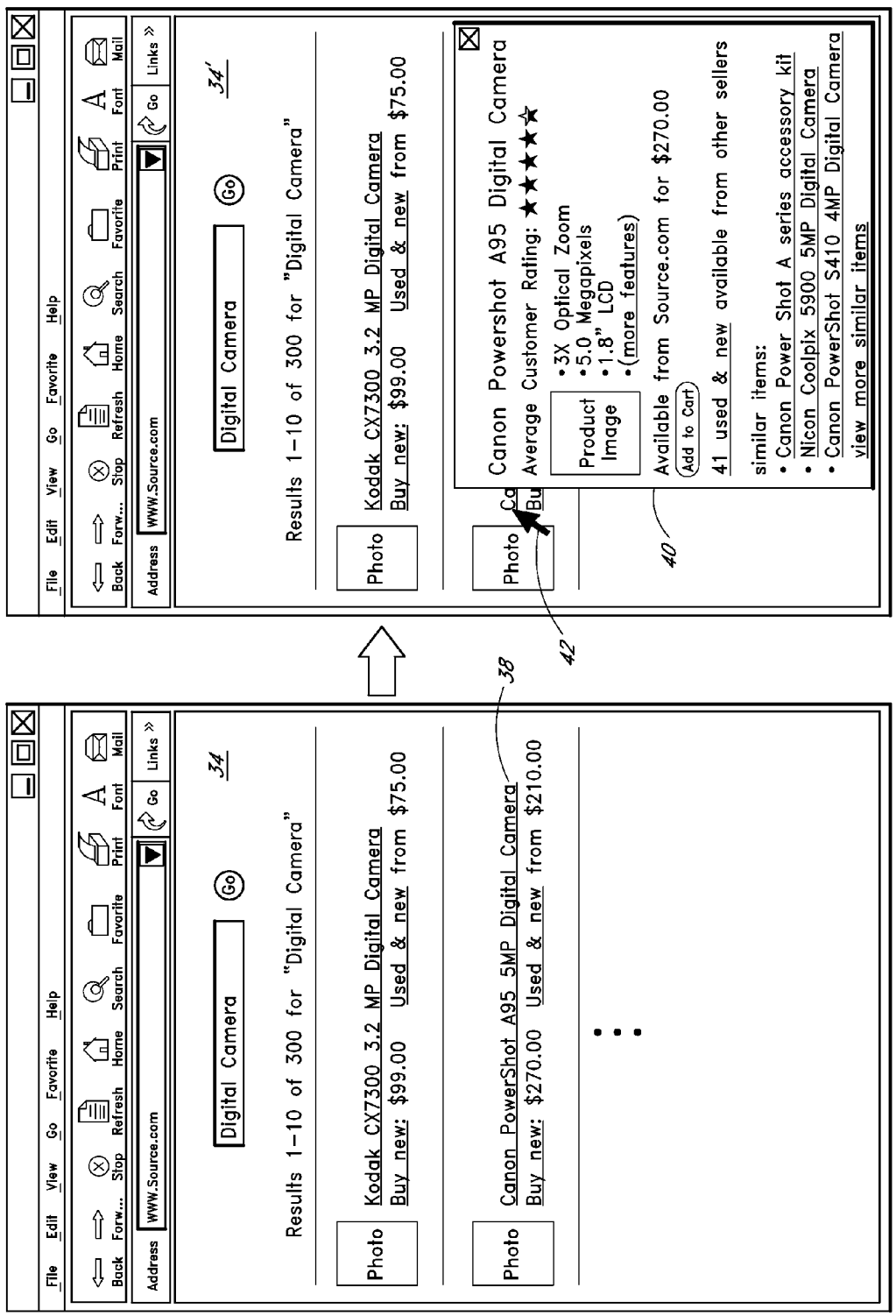
FIG. 6 shows one example of a "single site" embodiment in which the web site that serves the initial web page also supplies the content subsequently used to update the web page.

FIG. 6 illustrates a "single web site" example in which no separate target site is involved. In this example, the source web site 90 is again an e-commerce site that hosts an electronic catalog of products that are available for purchase therefrom. The user in this example has conducted a catalog search, and is viewing a search results page 34. While viewing the search results page, the user can hover the mouse pointer 42 over a product link 38 to cause a product popover (overlay display object) 40 to be displayed with information about the corresponding product. The user can alternatively click on this product link 38 to access the product's detail page.

The content and functionality of the product popover 40 in this example of FIG. 6 may be the same as in the example of FIG. 5. Because the source entity has control over the native content of the page 34, however, the implementation of the page update handler 36 may be different. For example, rather than checking for recognized link formats or product names in the page 34, the page update handler 36 may check for embedded popover tags that specify the locations and the product identifiers of the product popovers that are to be generated. These popover tags may be added to the HTML document when the web page is initially generated by the content server 30, or may be included in the associated template as static content. Further, some or all of the code of the page update handler 36 may be included in the web page 34 when the page is initially served.

An important aspect of this example of FIG. 6 is that the user can interactively browse the electronic catalog without losing the context of the current web page 34, and without having to open a separate browser window. For instance, the user can hover the mouse pointer 42 over each product link on the search results page 34 to view more detailed information about each product before proceeding to a particular product detail page. If desired, the user can also conduct or initiate purchase transactions via the product popover. Although the product popover 40 is illustrated on a search results page in this example, similar product popovers may be displayed elsewhere on the source web site, such as on the home or "gateway" page, browse node (product category) pages, product detail pages, personalized recommendations pages, and any other type of page that includes one or more links to a product detail page.

As another example, a web search engine site may incorporate web link popovers of the type shown in FIG. 4 into its search results pages. In this embodiment, when the user views a web search results page, the user can hover the mouse cursor 42 over each search results link to view supplemental information, where available, about the corresponding web site or web page located by the search engine.

Numerous other applications involving a single web site will be apparent to those skilled in the art.

VII. Example System Architecture

FIG. 7

Figure 7:
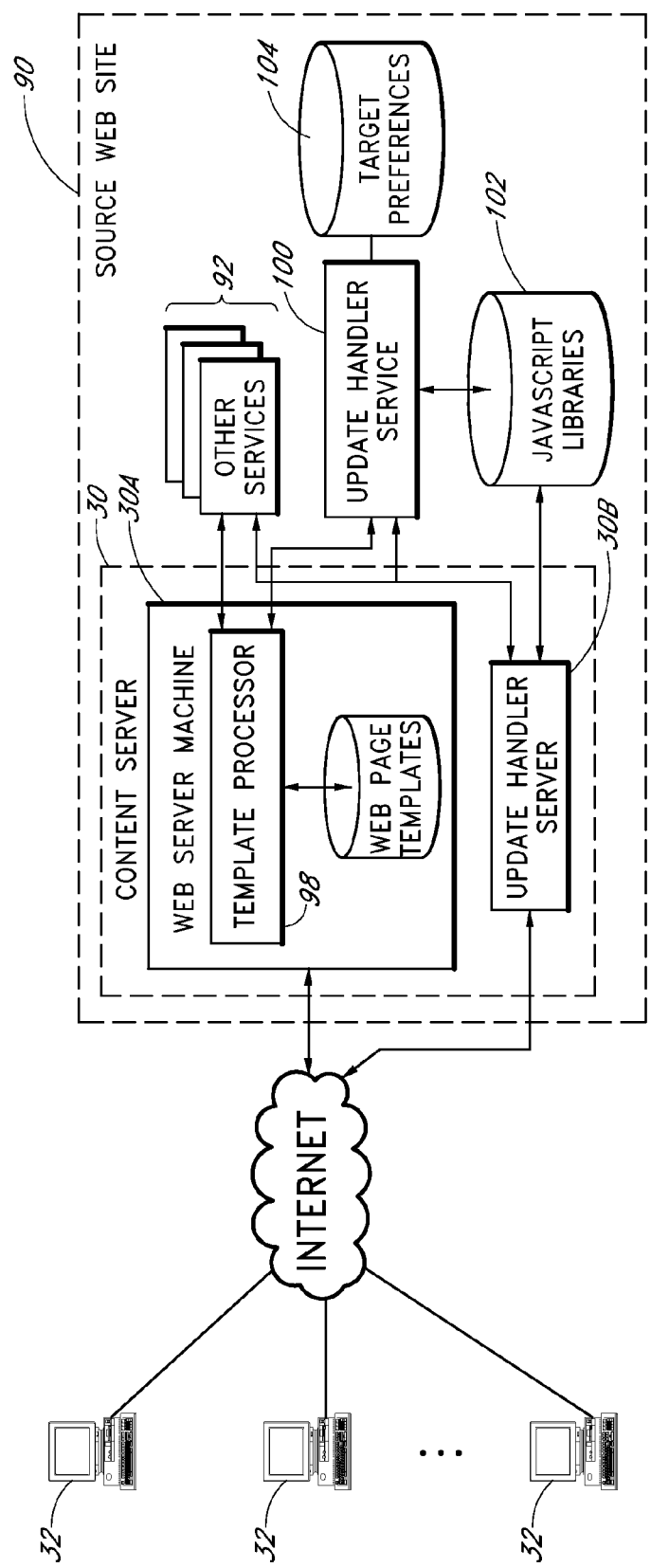
FIG. 7 illustrates one example of a set of components that may be used to implement the source web site.

FIG. 7 illustrates one example of a set of components that may be used to implement the source web site 90. In this particular example, the content server 30 includes two different types of physical servers or machines, a web server 30A and an update handler server 30B. A single physical server that implements the functionality of both the web server 30A and the update handler server 30B may alternatively be used. Although only one web server 30A and one update handler server 30B are shown, many web servers and update handler servers may be provided in a given system 90.

As illustrated in FIG. 7, the content server 30 is accessed over the Internet by computing devices 32 (PCs, PDAs, etc.) of users. These users may include both end users (typically consumers) who load and interact with web pages that include popover functionality, and target entities that use the source web site 90 to add popover functionality to their respective web sites 80. Each user computing device 32 runs web browser software.

Each web server machine 30A is responsible for serving both ordinary web pages, and special mini web pages that are displayed in overlay display objects 40. Both types of web pages are generated by the web server 30A via a template processor 98 that processes web page templates. The web server 30A generates these web pages using content retrieved from one or more services 92, which may but need not be implemented as web services. To generate an ordinary or mini web page requested by a user computer 32, the template processor 98 initially retrieves an associated template from storage, and processes the template to identify any service calls that are to be made to obtain the content associated with the requested page. The content returned from the services 92 is then used by the template processor 98 to generate the web page.

The types of services 92 provided within a given web site system 90 may vary widely. For example, where the source web site 90 is an e-commerce site that sells products, services 92 may be provided for supplying catalog content, authenticating users, maintaining user shopping carts, handling payment transactions, generating personalized recommendations, tracking associate-originated transactions, and performing various other tasks. In the illustrated embodiment of FIG. 7, the system also includes an "update handler service" 100 to support the addition of popover functionality to web pages of target web sites 80, and possibly web pages of the source web site 90. This service 100 may maintain a "target preferences" repository 104 that stores data regarding the popover preferences of (e.g., the types of popovers selected for display by) the various target entities. As mentioned above, these preferences may alternatively be encoded entirely within the update handler tags. The invention may also be implemented without allowing the target entities to vary or control the types of popover functionality provided on their sites 80.

In one embodiment, when a user loads an HTML document 34 that includes an update handler tag, the user's browser/computer 32 initially sends a request to the web server 30A for JavaScript code associated with this tag, and the web server 30A passes this request to the update handler service 100. The update handler service 100 responds by identifying the JavaScript library or libraries that are to be loaded. If the update handler tag includes a unique identifier of the target entity or target site, these JavaScript libraries may be identified based on associated popover preferences stored in the repository 104. Otherwise, the libraries to be loaded may be determined using preference information encoded in the tag. Other factors, such as the identity of the user making the request and the type of browser used, may also be taken into consideration.

The update handler service 100 and web server 30A then return a block of JavaScript code which, when executed, causes the user computer/browser 32 to request the selected JavaScript libraries from the update handler server 30B. Execution of these JavaScript libraries may in turn cause other JavaScript libraries to be loaded from the update handler server 30B (e.g., in response to detection of a particular type of item 38 on the web page). Thus, in the illustrated embodiment of FIG. 7, the task of loading JavaScript libraries is offloaded to one or more physical servers 30B that are separate from the web server(s) 30A. In other embodiments, the requests for JavaScript libraries may be sent to and processed by the web server machine(s) 30A.

The JavaScript libraries that form the update handler code may be maintained in any type of computer storage 102 (disk storage, solid state RAM storage, etc.). As least some of these libraries are not specific to any particular web page or web page format, but rather can be used to analyze and supplement web pages across many different web sites.

VIII. Immediately-Displayed Overlay Display Objects

In some embodiments of the invention, and particularly those in which the update handler 36 begins analyzing the web page's content without waiting for a mouse-over event, the overlay display object(s) 40 may alternatively be displayed before corresponding mouse-over events occur. For example, upon detecting a particular content item 38 and retrieving the associated content, a page update handler 36 may immediately display the overlay display object 40 with the retrieved content—even though a corresponding mouse-over event has not yet occurred. This overlay display object 40 may thereafter remain visible on the web page 34' until the user selects the "close" control. The user may also be able to close all open overlay display objects on the supplemented web page 34' via a keyboard action, such as by pressing the ESC key.

In the case of target web sites 80, the target entities may be able to specify, using the methods described above, whether the overlay display objects are to be displayed immediately. In addition, the target entities may be able to specify different display behaviors for different types of popovers.

IX. Conclusion

Although the invention has been described in terms of certain preferred embodiments and applications, other embodiments and applications that are apparent to those of ordinary skill in the art are also within the scope of this invention. In this regard, the claims are not limited in scope to embodiments that address all of the problems described herein with prior art methods, and are not limited to embodiments that provide all of the benefits described herein.

The scope of the present invention is defined only by the appended claims, which are to be interpreted without reliance on any definitions that may be set forth in the incorporated-by-reference materials. Any reference characters included in the method claims are provided for reference only, and do not imply a particular order for performing the recited actions.

What is claimed is:

1. A method performed by a user computing device upon loading a web page of a web site, said method comprising:
    loading an update handler over a network in response to an update handler tag included in the web page, said update handler loaded as a part of the web page; and
    under control of the update handler:
        detecting, via an analysis of content of the web page, that the web page includes a link to a product page of an electronic catalog of products, said detecting comprising determining that the link matches a pre-specified link signature that specifies a link format of product pages of said electronic catalog;
        retrieving, over a network from a content server that is distinct from the web site, supplemental content associated with said link, said supplemental content comprising catalog content associated with a product corresponding to said link; and
        in response to a mouse-over event associated with the link, supplementing the web page with a display object that displays the supplemental content in association with the link, said display object providing functionality for a user of the user computing device to complete a purchase of a product from the electronic catalog;
    said method performed by the user computing device under the control of executable instructions.

2. The method of claim 1, wherein the display object provides interactive functionality for a user of the user computing device to purchase the product from a merchant associated with the electronic catalog via interaction with the content server, without navigating away from the web page.

3. The method of claim 2, wherein the web site is enrolled in an affiliate marketing program associated with the merchant.

4. The method of claim 3, wherein the link includes an affiliate identifier associated with the web site, and the method comprises transmitting the affiliate identifier to the content server to enable the content server to associate the purchase with said web site.

5. The method of claim 1, wherein the link includes a product identifier corresponding to the product, and the method comprises extracting the product identifier from the link and transmitting the product identifier to the content server.

6. The method of claim 1, wherein the method is performed in part via browser execution of the update handler.

7. The method of claim 1, wherein the method comprises the user computing device retrieving the update handler over the network from a source that is distinct from said web site.

8. The method of claim 1, wherein the content server operates in an Internet domain which is different from an Internet domain of said web site, and wherein retrieving the supplemental content comprises retrieving, from said content server, a script file that has supplemental HTML content encoded therein, and extracting the supplemental HTML content from the script file.

9. A non-transitory computer-readable medium that stores an update handler that is loadable over a network by a user computing device as part of a web page in response to an update handler tag included in the web page, said update handler comprising executable code that directs the user computing device to perform a method that comprises:
    detecting, via an analysis of content of a web page loaded on the user computing device, that the web page includes a link to a product page of an electronic catalog of products, said detecting comprising determining that the link matches a pre-specified link signature that specifies a link format of product pages of the electronic catalog;
    in response to detecting that the link matches the pre-specified link signature, retrieving, over a network from a content server that is distinct from the web site, supplemental content associated with said link, said supplemental content comprising catalog content associated with a product corresponding to said link; and
    in response to a mouse-over event associated with the link, supplementing the web page with a display object that displays the supplemental content in association with the link, said display object providing functionality for a user of the user computing device to complete a purchase of a product from the electronic catalog.

10. The computer-readable medium of claim 9, wherein the electronic catalog of products is hosted by the content server.

11. The computer-readable medium of claim 10, in combination with said content server, wherein the executable code and content server collectively provide functionality for a user to, via interaction with the content server through the display object, purchase a product represented in the electronic catalog.

12. The computer-readable medium and content server of claim 11, wherein the content server includes functionality for causing an affiliate associated with said web site to be paid a commission for originating a purchase of the product.

13. The computer-readable medium of claim 9, wherein the method comprises displaying the display object on the web page in response to a mouse-over event in which a mouse pointer is hovered over said link.

14. The computer-readable medium of claim 9, wherein retrieving the supplemental content comprises retrieving, from said content server, a script file that has supplemental HTML content encoded therein, and extracting the supplemental HTML content from the script file.

15. The computer-readable medium of claim 9, wherein the executable code is browser-executable code.

16. The computer-readable medium of claim 15, in combination with a server that hosts said web page, said server operating in a different internet domain than an internet domain of the content server.

17. A system that provides functionality for supplementing pages of web sites with content, the system comprising:
    a content server configured to serve content in response to requests from browsers running on user computing devices, including catalog content associated with particular products represented in an electronic catalog; and
    a repository of update handler code that is adapted to be transmitted to, and executed by, user computing devices in connection with the pages, said update handler code configured to cause a user computing device to at least:
        detect that a page loaded by a browser includes a link that matches a link signature that specifies a link format of catalog pages of the electronic catalog;
        in response to detecting that the link matches the link signature, retrieve, from the content server, catalog content associated with the link, said catalog content including product information associated with a product to which the link corresponds; and in response to a mouse-over event associated with the link, supplement the web page with a display object that displays the catalog content and provides functionality for a user to purchase the product.

18. The system of claim 17, wherein the link is a link to a product detail page of the electronic catalog, and the catalog content associated with the link corresponds to said product detail page.

19. The system of claim 18, wherein the content server and update handler code collectively provide functionality for a user that accesses the page to purchase a product corresponding to the product detail page by interacting with content displayed in the display object.

20. The system of claim 17, in combination with an affiliate site that is separate from the content server, said affiliate site hosting a web page that includes a link to a catalog page of the electronic catalog, said link matching the link signature, said web page additionally including an update handler tag that is configured to cause a browser that loads said web page to load at least a portion of the update handler code.

21. The system of claim 20, wherein the update handler code provides functionality for a user to purchase a product from a merchant associated with the electronic catalog by interacting with content displayed in a display object added to the web page of the affiliate site.

22. A system that hosts an affiliate web site, the system comprising:

a web server comprising computer hardware; and a non-transitory computer data repository that stores a web page of the affiliate site, said web page served by the web server, said web page including a link to a catalog page of an electronic catalog hosted by a second web site that is distinct from the affiliate site, said web page additionally including an update handler tag, said update handler tag configured to cause a user computing device that loads the web page to load an update handler as part of the web page, said update handler configured to cause the user computing device to at least:

detect that the link matches a pre-specified link signature associated with the electronic catalog, said link signature specifying a link format of catalog pages of the electronic catalog;

in response to detecting that the link matches the pre-specified link signature, retrieve, from a content server associated with the second web site, catalog content associated with the link; and in response to a mouse-over event associated with the link, supplement the web page with a display object that displays the retrieved catalog content in association with the link, said display object providing functionality for a user of the user computing device to complete a purchase of a product from the electronic catalog.

23. The system of claim 22, in combination with a system that is responsive to said purchase by causing an affiliate associated with the affiliate web site to be paid a commission.

24. The system of claim 22, wherein the link points to a product detail page of the electronic catalog, and the catalog content includes information regarding a product featured on the product detail page.

25. The system of claim 22, wherein the link includes an affiliate identifier corresponding to the affiliate site.

* * * * *